United States Patent [19]

Schmidt et al.

[11] Patent Number: 5,366,809
[45] Date of Patent: Nov. 22, 1994

[54] SILICONE PRESSURE-SENSITIVE ADHESIVES

[75] Inventors: Randall G. Schmidt; Gary A. Vincent, both of Midland, Mich.

[73] Assignee: Dow Corning Corporation, Midland, Mich.

[21] Appl. No.: 114,862

[22] Filed: Sep. 2, 1993

[51] Int. Cl.$^5$ .............................................. B32B 27/00
[52] U.S. Cl. ................................... 428/447; 428/429; 428/450; 428/451; 428/452; 525/478
[58] Field of Search ................ 525/478; 428/447, 429, 428/450, 451, 452

[56] References Cited

U.S. PATENT DOCUMENTS

| | | | |
|---|---|---|---|
| 4,774,297 | 9/1988 | Murakami | 525/478 |
| 4,988,779 | 1/1991 | Medford | 525/478 |
| 5,034,061 | 7/1991 | Maguire | 106/287.14 |
| 5,169,727 | 12/1992 | Boardman | 428/447 |

FOREIGN PATENT DOCUMENTS

| | | |
|---|---|---|
| 253601 | 7/1987 | European Pat. Off. . |
| 355991 | 7/1989 | European Pat. Off. . |
| 506370 | 3/1992 | European Pat. Off. . |
| 506371 | 3/1992 | European Pat. Off. . |
| 506372 | 3/1992 | European Pat. Off. . |
| 537785 | 4/1993 | European Pat. Off. . |
| 92/07916 | 5/1992 | WIPO . |

*Primary Examiner*—Melvyn L. Marquis
*Attorney, Agent, or Firm*—Alexander Weitz; Sharon K. Severance

[57] ABSTRACT

A silicone pressure-sensitive adhesive composition having high adhesion and tack while having a high percentage of adhesive failure when peeled from substrates is disclosed, said composition consisting essentially of (A) 50 to 80 parts by weight of an MQ organopolysiloxane resin;

(B) 20 to 50 parts by weight of a polydiorganosiloxane having at least 3 alkenyl groups in its molecule, with the proviso that the alkenyl group content of said polydiorganosiloxane is 0.1 to 4 mole percent, the total amount of components (A) and (B) being 100 parts by weight;

(C) an organohydrogenpolysiloxane crosslinking agent having, on average, at least 3 SiH groups per molecule, the amount of said organohydrogenpolysiloxane being sufficient to provide a molar ratio of said SiH groups of component (C) to said alkenyl groups of component (B) in the range of 0.1 to <1.0; and (D) a curing amount of a hydrosilation catalyst.

22 Claims, 2 Drawing Sheets

SILICONE PRESSURE-SENSITIVE ADHESIVES

FIELD OF THE INVENTION

The present invention relates to a silicone pressure-sensitive adhesive which comprises a resin component, a polymer component having alkenyl groups in its molecule, a silicon hydride-functional crosslinking agent and a catalyst. More particularly, the invention relates to an improved silicone pressure-sensitive adhesive wherein the molar ratio of SiH groups of said crosslinking agent to alkenyl groups of said polymer is 0.1 to <1.0.

BACKGROUND OF THE INVENTION

Silicone pressure-sensitive adhesives (hereinafter also referred to as PSAs) typically contain at least two primary components, namely a linear siloxane polymer and an MQ resin consisting essentially of triorganosiloxane (M) units (i.e., $R_3SiO_{\frac{1}{2}}$ units, in which R denotes a monovalent organic group) and silicate (Q) units (i.e., $SiO_{4/2}$ units). In addition to the above two ingredients, silicone PSA compositions are generally provided with some crosslinking means in order to optimize various properties of the final adhesive product. And, in view of the high viscosity imparted by the polymer component, these PSA compositions are typically dispersed in an organic solvent for ease of application.

When such silicone PSA compositions employ an alkenyl-functional polymer and a crosslinking agent containing silicon-bonded hydrogen atoms, they can be cured by a hydrosilation addition reaction therebetween using a platinum-type catalyst. In such systems, the molar ratio of silicon-bonded hydrogen groups to silicon-bonded alkenyl groups is typically greater than 1, as exemplified by the disclosure of U.S. Pat. No. 4,988,779 to Medford et al. Although many of these PSAs have good adhesive properties, they often lack a balance between aggressive adhesion to substrates, such a metal, and high initial tack. A major drawback of such systems is that they tend to fail in a cohesive mode when peeled from a substrate, particularly when the peel rate is high. This has the untoward effect of transferring some of the adhesive to the substrate from which it is peeled (i.e., small "islands" of PSA remain on the substrate after the PSA is delaminated therefrom). This is highly undesirable in many commercial applications (e.g., in electronic masking applications do not want PSA residue left on components).

SUMMARY OF THE INVENTION

It has now been found that silicone PSA compositions having both high adhesion and high tack can be prepared from certain alkenyl-functional polymers in combination with crosslinkers containing silicon-bonded hydrogen wherein the molar ratio of silicon-bonded hydrogen groups to silicon-bonded alkenyl groups is 0.1 to <1.0. At the same time, the optimum PSAs according to the present invention exhibit at least a 90% adhesive failure mode when subjected to a standard peel test, described infra, thus reducing or eliminating the above mentioned adhesive transfer problem. Furthermore, it has surprisingly been found that the instant silicone PSAs typically have a lower adhesion to a fluorosilicone release liner than comparable systems wherein the above mentioned molar ratio is at least 1 still while maintaining their aggressive adhesion to substrates such as steel. This latter characteristic facilitates release of the PSA from fluorosilicone release liners such as described in U.S. Pat. No. 4,736,048 to Brown et al., assigned to the assignee of the present invention and hereby incorporated by reference.

The present invention therefore relates to a silicone pressure-sensitive adhesive consisting essentially of (A) 50 to 80 parts by weight of a soluble organopolysiloxane resin consisting essentially of $R_3SiO_{\frac{1}{2}}$ siloxane units and $SiO_{4/2}$ siloxane units wherein each R denotes a monovalent radical selected from the group consisting of hydrocarbon and halogenated hydrocarbon radicals, at least $\frac{1}{3}$ of all R radicals being methyl and the mole ratio of $R_3SiO_{\frac{1}{2}}$ siloxane units to $SiO_{4/2}$ siloxane units in the soluble organopolysiloxane having a value of from 0.6/1 to 1.2/1;

(B) 20 to 50 parts by weight of a polydiorganosiloxane, the organic radicals thereof being selected from the group consisting of hydrocarbon and halogenated hydrocarbon radicals wherein at least $\frac{1}{2}$ of said organic radicals are methyl, said polydiorganosiloxane having at least 3 alkenyl groups in its molecule, with the proviso that the alkenyl group content of said polydiorganosiloxane is 0.1 to 4 mole percent, the total amount of components (A) and (B) being 100 parts by weight;

(C) an organohydrogenpolysiloxane crosslinking agent having, on average, at least 3 SiH groups per molecule, the amount of said organohydrogenpolysiloxane being sufficient to provide a molar ratio of said SiH groups of component (C) to said alkenyl groups of component (B) in the range of 0.1 to <1.0; and (D) a curing amount of a hydrosilation catalyst. The present invention further relates to a substrate having at least a portion of its surface coated with the above described pressure-sensitive adhesive composition.

DETAILED DESCRIPTION OF THE INVENTION

Figure 1:
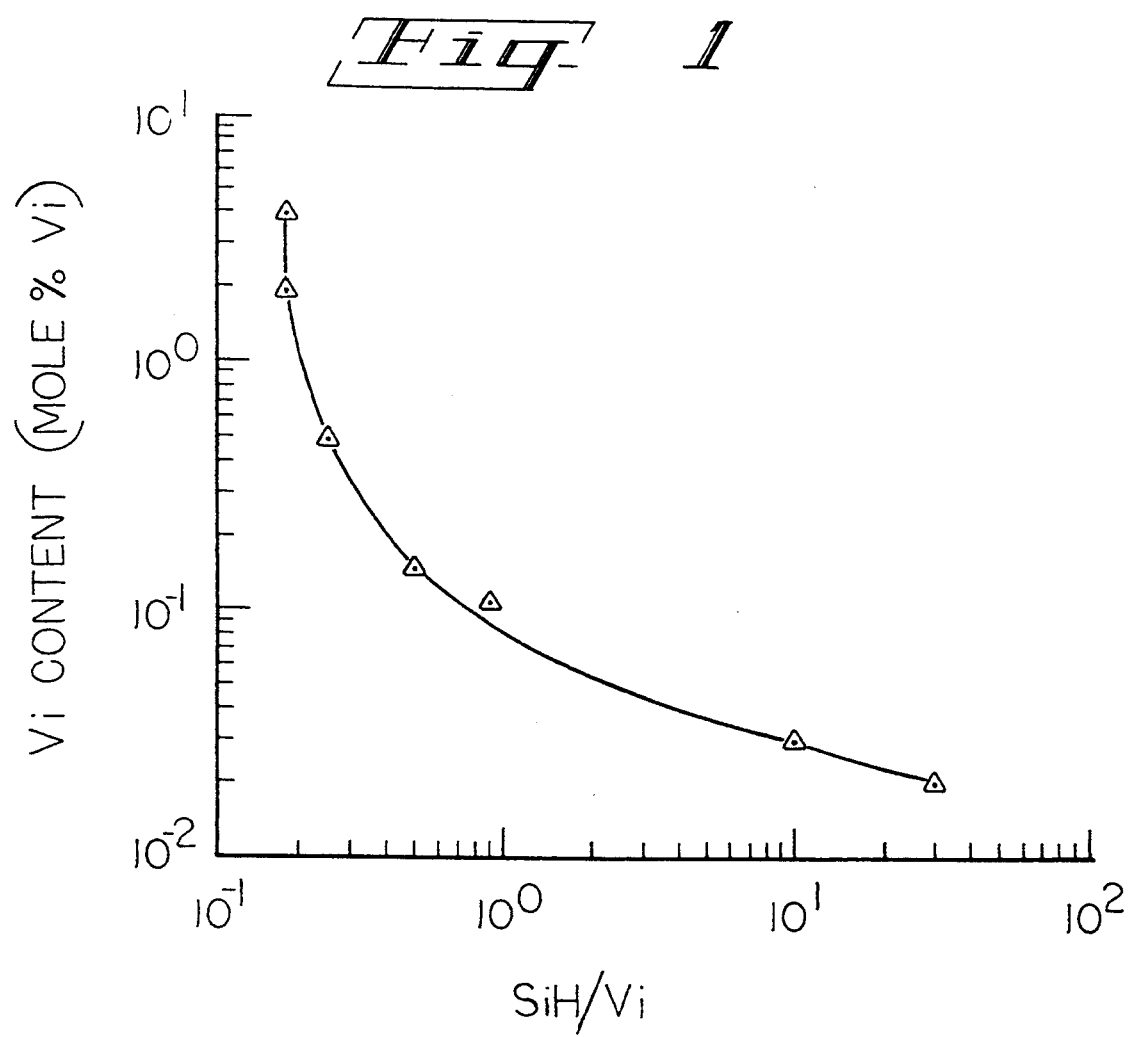
FIG. 1 is a plot of the molar vinyl group content of the PSA polymer versus the molar ratio of silicon-bonded hydrogen groups to silicon-bonded vinyl groups for optimum adhesive strength.

Component (A) of the present invention is a soluble, hydroxyl-functional organopolysiloxane resin consisting essentially of $R_3SiO_{\frac{1}{2}}$ siloxane units and $SiO_{4/2}$ siloxane units. By the term soluble it is meant that the organopolysiloxane can be dissolved, substantially completely, in either a hydrocarbon liquid such as benzene, toluene, xylene, heptane and the like or in a silicone liquid such as cyclic or linear polydiorganosiloxanes. Preferably the resin is soluble in component (B), delineated below.

In the formula for component (A), R denotes a monovalent radical selected from the group consisting of hydrocarbon and halogenated hydrocarbon radicals, preferably having less than 20 carbon atoms, and most preferably having from 1 to 10 carbon atoms. Examples of suitable R radicals include alkyl radicals, such as methyl, ethyl, propyl, pentyl, octyl, undecyl and octadecyl; cycloaliphatic radicals, such as cyclohexyl; aryl radicals such as phenyl, tolyl, xylyl, benzyl, alpha-methyl styryl and 2-phenylethyl; alkenyl radicals such as vinyl; and chlorinated hydrocarbon radicals such as 3-chloropropyl and dichlorophenyl.

To enhance the solubility of component (A) in component (B), described infra, it is desirable to select the predominant organic radicals of the former to match the predominant organic radicals of the latter. Preferably, at least one-third, and more preferably substantially all R radical in the formula for component (A), are methyl radicals. The methyl radicals can be distributed in any desired arrangement among the $R_3SiO_{\frac{1}{2}}$ siloxane units; however, it is preferred that each $R_3SiO_{\frac{1}{2}}$ siloxane unit bear at least one, and more preferably at least two, methyl radicals. Examples of preferred $R_3SiO_{\frac{1}{2}}$ siloxane units include $Me_3SiO_{\frac{1}{2}}$, $PhMe_2SiO_{\frac{1}{2}}$ and $Ph_2MeSiO_{\frac{1}{2}}$ where Me hereinafter denotes methyl and Ph hereinafter denotes phenyl.

Component (A) includes a resinous portion wherein the $R_3SiO_{\frac{1}{2}}$ siloxane units (i.e., M units) are bonded to the $SiO_{4/2}$ siloxane units (i.e., Q units), each of which is bonded to at least one other $SiO_{4/2}$ siloxane unit. Some $SiO_{4/2}$ siloxane units are bonded to hydroxyl radicals resulting in $HOSiO_{3/2}$ units (i.e., TOH units), thereby accounting for the silicon-bonded hydroxyl content of the organopolysiloxane, and some are bonded only to other $SiO_{4/2}$ siloxane unit. In addition to the resinous portion, component (A) can contain a small amount of a low molecular weight material comprised substantially of a neopentamer organopolysiloxane having the formula $(R_3SiO)_4Si$, the latter material being a byproduct in the preparation of the resin according to the methods of Daudt et al., described infra.

For the purposes of the present invention, component (A) consists essentially of $R_3SiO_{\frac{1}{2}}$ siloxane units and $SiO_{4/2}$ siloxane units in a molar ratio of 0.6 to 1.2, respectively. It is preferred that the mole ratio of the total M siloxane units to total Q siloxane units of (A) be between 0.8 and 1.1, most preferably 0.9 to 1.0. The above M/Q mole ratios can be easily obtained by $^{29}Si$ nuclear magnetic resonance, this technique being capable of a quantitative determination of the molar contents of: M(resin), M(neopentamer), Q(resin), Q(neopentamer) and TOH. For the purposes of the present invention, as implicitly stated supra, the M/Q ratio {M(resin)+M(neopentamer)}/{Q(resin)+Q(neopentamer)} represents the ratio of the total number of triorganosiloxy groups of the resinous and neopentamer portions of component (A) to the total number of silicate groups of the resinous and neopentamer portions of (A). It will, of course, be understood that the above definition of the M/Q ratio applies to resins which contain neopentamer as a byproduct of preparation and no further addition of neopentomer is contemplated. Further, when the resin (A) is prepared by another method (e.g., by co-hydrolysis and condensation of alkoxysilanes), neopentamer may not be present and the M/Q ratio would then be defined in terms of only the resinous portion. It is further preferred that the resinous portion of component (A) have a number average molecular weight ($M_n$) of about 2,000 to 6,000, particularly about 2,300 to 3,300, when measured by gel permeation chromatography (GPC), the neopentamer peak, if present, being excluded from the measurement. In this molecular weight determination, narrow fractions of MQ resins are used to calibrate the GPC equipment, the absolute molecular weights of the fractions being first ascertained by a technique such as vapor phase osmometry. Component (A) can be prepared by any method providing said method provides a soluble organopolysiloxane consisting essentially of $R_3SiO_{\frac{1}{2}}$ siloxane units and $SiO_{4/2}$ siloxane units. It is preferably prepared by the silica hydrosol capping process of Daudt, et al., U.S. Pat. No. 2,676,182; as modified by Brady, U.S. Pat. No. 3,627,851; and Flannigan, U.S. Pat. No. 3,772,247; each patent being incorporated herein by reference to teach how to prepare soluble organopolysiloxanes which meet the requirements of the present invention.

Briefly stated, the process of Daudt et al. used to prepare the preferred component (A) comprises limiting the concentration of the sodium silicate solution, and/or the silicon-to-sodium ratio in the sodium silicate, and/or the time before capping the neutralized sodium silicate solution to generally lower values than those disclosed by Daudt et al. in order to prevent excessive growth of the silica particles and to obtain a soluble organopolysiloxane having the preferred $M_n$. Thus, the preferred silicate concentration is generally limited to a value of 40 to 120, preferably 60 to 100, and most preferably about 75 grams/liter. The neutralized silica hydrosol is preferably stabilized with an alcohol, such as isopropanol, and capped with $R_3SiO_{\frac{1}{2}}$ siloxane units as soon as possible, preferably within 30 seconds, after being neutralized. The sodium silicate employed preferably has the formula $Na_2O \cdot xSiO_2$, wherein x has a value of 2 to 3.5.

The level of the silicon bonded hydroxyl groups on the organopolysiloxane component (A), may be reduced, preferably to less than about 1 weight percent. This may be accomplished, for example, by reacting hexamethyldisilazane with the organopolysiloxane. Such a reaction may be catalyzed, for example, with trifluoroacetic acid. Alternatively, trimethylchlorosilane or trimethylsilylacetamide may be reacted with the organopolysiloxane, a catalyst not being necessary in this case.

Component (B) of the present invention is a polydiorganosiloxane in which the organic radicals are selected from the group consisting of hydrocarbon and halogenated hydrocarbon radicals. For the purposes of the present invention at least ½ of these organic radicals are methyl and the polydiorganosiloxane has, on average, at least 3 alkenyl groups in its molecule, with the proviso that its alkenyl group content is about 0.1 to 4 mole percent, preferably about 0.1 to 0.5 mole percent. This latter quantity may be calculated according to the following equation:

$$\% \text{ alkenyl content} = (\text{Alk})/(\text{Silox}) \times 100 \qquad (i)$$

wherein Alk=moles of alkenyl radicals in the polydiorganosiloxane and Silox=total moles of siloxane units in the polydiorganosiloxane. When the alkenyl content is below about 0.1 mole percent, optimum adhesion and tack properties can not be obtained at a molar ratio of silicon-bonded hydrogen groups to silicon-bonded alkenyl groups of less than 1.0. On the other hand, when the alkenyl content is more than about 4 mole percent, more cohesive failure is observed and it is difficult to maintain a good balance between adhesion and tack and still attain a level of adhesive failure of at least 90%.

Preferably, component (B) is a polymer or copolymer having the general formula $R^1R^2_2SiO(R^2_2SiO)_n$-$SiR^2_2R^1$ wherein each $R^2$ is a monovalent radical independently selected from the group consisting of hydrocarbon and halogenated hydrocarbon radicals and each $R^1$ denotes a radical selected from the group consisting of $R^2$ radicals and an OH radical. The $R^2$ radicals may be selected from the saturated hydrocarbon and halogenated hydrocarbon radicals delineated above for R or alkenyl radicals having 2 to 10 carbon atoms. Examples of the latter include vinyl, allyl, butenyl, hexenyl, cyclohexenyl and beta-cyclohexenylethyl. Preferably, the alkenyl radicals are vinyl, hereinafter also represented as Vi. As implied above, on average, at least three $R^2$ radicals in the above formula are alkenyl radicals. Of course, the average value of n in the above formula is such that it comports with the above stated requirements of alkenyl group content. Thus, for example, if polydiorganosiloxane (B) has only 3 alkenyl radicals in its molecule, the minimum permissible degree of polymerization (DP), including terminal siloxane units, may be calculated from equation (i): $4\% = (3)/DP \times 100$ such that $DP = 75$. It is preferred that the average DP of polydiorganosiloxane (B) is greater than about 500.

Component (B) can be comprised of a single polydiorganosiloxane or a mixture of two or more different polydiorganosiloxanes. It is preferred that at least 85% of the $R^2$ radicals of component (B) are methyl radicals, which radicals can be distributed in any manner in the polydiorganosiloxane. Further, component (B) can comprise trace amounts of siloxane branching sites provided that it remains flowable.

Component (C) of the present invention is at least one organohydrogenpolysiloxane crosslinking agent having, on average, at least 3 SiH groups per molecule. It is thus to be understood that component (C) can be a mixture of an organohydrogenpolysiloxane having only 2 SiH groups per molecule with one or more organohydrogenpolysiloxanes having more than 3 SiH groups per molecule, as long as the final crosslinking agent has, on average, at least 3 SiH groups per molecule. When component (C) contains an average of fewer than 3 SiH groups per molecule, the adhesive properties of the PSAs prepared therewith are inferior, particularly when the number average molecular weight of the resin (A) is greater than about 3,500.

Component (C) may be an SiH-functional resin, similar to those described supra as component (A) wherein at least some of the M units have been replaced with siloxane units of the structure $R_2HSiO_{\frac{1}{2}}$, in which R has its previously defined meaning. Preferably, component (C) is a linear siloxanes having the formula

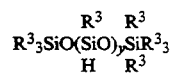   (I)

or

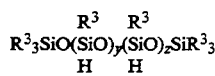   (II)

wherein $R^3$ is independently selected from the group consisting of alkyl radicals having 1 to 4 carbon atoms, such as methyl, ethyl and propyl; a phenyl radical; a trifluoropropyl radical; and a chloropropyl group. In formulas (I) and (II), y has an average value of about 3 to 40 and z has an average value of 1 to about 100.

The above described organohydrogenpolysiloxanes of the invention are well known in the art and many of these compounds are available commercially.

In addition to the above described materials, component (C) may be selected from the crosslinking agents disclosed in U.S. patent application Ser. No. 07/998,492, filed on Dec. 30, 1992, now Pat. No. 5,290,885 assigned to the assignee of the present invention and hereby incorporated by reference. Briefly stated, these crosslinking agents comprise a reaction product of an organohydrogenpolysiloxane (I) and an unsaturated organic compound (II). The organohydrogenpolysiloxane (I) is either a cyclic siloxane having the formula

   (i)

or a linear siloxane having the formula

   (ii)

or

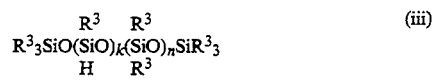   (iii)

wherein $R^3$ is independently selected from the group consisting of alkyl radicals having 1 to 4 carbon atoms, such as methyl, ethyl and propyl; a phenyl radical; a trifluoropropyl radical; and a chloropropyl group. In formulas (i), (ii) and (iii), j has an average value of 4 to 8, k has an average value of 5 to 20 and n has an average value of 1 to 20, with the proviso that $k+n \leq 25$. In preferred cyclic organohydrogenpolysiloxanes, each $R^3$ is matched with the organic radicals of components (A) and (B) and the average value of j is 5 to 7, most preferably 5. The preferred linear organohydrogenpolysiloxanes are represented by formula (ii) wherein k is 5 to 10 and each $R^3$ is similarly matched. The unsaturated organic compound (II) can be a linear or branched alpha-alkene having 6 to 28 carbon atoms. This compound is preferably selected from linear alkenes having the formula $CH_2=CH_2(CH_2)_mCH_3$ wherein m is 5 to 25, more preferably 9 to 25 and most preferably 9 to 15. Specific examples of preferred alpha-alkenes include 1-decene, 1-dodecene and 1-octadecene. Alternatively, (II) can be an aromatic compound having the formula Ph—$R^4$, wherein $R^4$ is a terminally unsaturated monovalent hydrocarbon group having 2 to 6 carbon atoms. Preferably, unsaturated organic compound (II) is alpha-methylstyrene.

In order to prepare the above described crosslinking agents, organohydrogenpolysiloxane (I) and unsaturated organic compound (II) are reacted using a platinum metal-type catalyst, described infra, to promote the hydrosilation addition of the SiH functionality of the former to the unsaturation of the latter. This reaction is well known in the art and is typically conducted at temperatures in the range of about 100° to 150° C., either neat or in the presence of an inert organic solvent such as toluene or hexane. For the purposes of the present invention, the relative amounts of components used to form the crosslinking agent are such that, on a theoretical basis, at least 10 mole percent of the original SiH functionality present in the organohydrogenpolysiloxane (I) is reacted with the unsaturated organic compound (II) and the final reaction product contains 3 to 15 residual SiH groups. It is preferred that the final crosslinking agent of this type contain 4 to 6 residual SiH groups per molecule and the ratio of (II) to (I) to be used in the above reaction can be calculated to approximate such a result.

Component (C) is added in an amount sufficient to provide from about 0.1 to <1.0, preferably from 0.2 to 0.6, silicon-bonded hydrogen atoms for each alkenyl radical in polydiorganosiloxane (B). The optimum amount of this crosslinking agent may be determined by routine experimentation using the data graphed in FIGS. 1 and 2, described infra, as a guideline.

The PSA compositions of the present invention additionally contain a platinum group metal-containing hydrosilation catalyst (D). These catalysts are exemplified by the well known platinum and rhodium catalysts which are effective for catalyzing the reaction of silicon-bonded hydrogen atoms with silicon-bonded alkenyl radicals. In addition, complexes of the metals ruthenium, palladium, osmium and irridium can be utilized. A preferred platinum-containing catalyst is a chloroplatinic acid-vinylsiloxane complex disclosed by Willing in U.S. Pat. No. 3,419,593, hereby incorporated by reference. Such platinum group metal-containing catalysts accelerate the reaction of component (B) with the crosslinking agent (C) and permit room temperature or low temperature curing of the composition. The platinum group metal-containing catalyst is added, e.g., in an amount sufficient to provide 0.1 to 1,000, preferably 1 to 500 and most preferably 10 to 300, parts by weight of platinum for each one million weight parts of the composition.

It is recommended that the instant PSA compositions also include a platinum catalyst inhibitor that is known in the art. Preferred platinum catalyst inhibitors include various "ene-yne" systems, such as 3-methyl-3-pentene-1-yne and 3,5-dimethyl-3-hexene-1-yne; acetylenic alcohols, such as 3-methyl-1-butyne-3-ol, 3,5-dimethyl-1-hexyne-3-ol, 3-methyl-1-pentyne-3-ol, and phenylbutynol; maleates and fumarates, such as the well-known dialkyl, dialkenyl and dialkoxyalkyl fumarates and maleates; cyclovinylsiloxanes; and benzyl alcohol. The platinum catalyst inhibitor can be used in any amount that will retard the above-described catalyzed addition reaction at room temperature while not preventing said reaction at elevated temperature; the proportion of this ingredient to be used may be readily determined by routine experimentation.

In general, small amounts of additional ingredients may be added to the compositions of this invention. For example, antioxidants, pigments, stabilizers, fillers, etc., may be added as long as they do not materially reduce the pressure sensitive adhesive properties of these compositions.

Compositions of this invention can be prepared by homogeneously mixing 50 to 80 parts by weight of component (A) and 20 to 50 parts by weight of component (B) in the presence of a non-reactive solvent (i.e., a total of 100 weight parts of resin and polymer). Preferably, from about 65 to about 75 parts of (A) per 100 parts by weight of (A)+(B) are used. Solvents useful in the present invention include hydrocarbons, such as toluene, xylene, heptane, and mineral spirits; volatile siloxanes, such as octamethylcyclotetrasiloxane and hexamethyldisiloxane; halohydrocarbons, alcohols, esters, ketones and combinations of these solvents. The amount of solvent required depends on the viscosity of the polydiorganosiloxane (B). Higher viscosity polydiorganosiloxane polymers require more solvent than lower viscosity polydiorganosiloxane polymers to facilitate the preparation, handling and application of the compositions. However, when polydiorganosiloxane (B) has a low DP (e.g., less than about 200), a solventless PSA can be obtained. Suitable mixing means for preparing the instant compositions include a spatula, a drum roller, a mechanical stirrer, a three-roll mill, a sigma blade mixer, a bread dough mixer, and a two-roll mill. Component (C) may be mixed with (A) and (B) and the platinum catalyst inhibitor can be incorporated in this mixture. The platinum group metal-containing catalyst is preferably added last, or just prior to use.

After application to a substrate, curing of the compositions of this invention can be accomplished by heating at temperatures of up to 300° C., preferably at 80° to 150° C., for a suitable length of time. Alternatively, when an inhibitor is also used, the PSAs according to the present invention can be cured by exposure to ultraviolet radiation.

The compositions of this invention find utility as pressure sensitive adhesives and will readily stick to a solid support, whether flexible or rigid. These compositions may be applied to a surface by any suitable means such as rolling, spreading, spraying, etc., and cured thereon as described above.

The surface of the support and the substrate to which the support is adhered may be any known solid material such as metals, such as aluminum, silver, copper, iron and their alloys; porous materials such as paper, wood, leather, and fabrics; organic polymeric materials such as polyolefins, such as polyethylene and polypropylene; fluorocarbon polymers such as polytetrafluoroethylene and polyvinylfluoride; polystyrene; polyamides such as Nylon; polyesters and acrylic polymers; painted surfaces; siliceous materials such as concrete, bricks, cinderblocks, and glass such as glass cloth, etc. Porous materials such as glass cloth are often impregnated with a substance that will prevent the migration of the silicone pressure sensitive adhesive from one surface to another surface of the support. In this regard, it is also well known to chemically treat the surface of a flourocarbon polymer support to enhance the adhesion of the silicone pressure sensitive adhesive to said surface.

Useful articles which can be prepared with the silicone pressure sensitive adhesives of this invention include pressure sensitive tapes, labels, transfer films, emblems and other decorative or informational signs, among others. An especially useful article is one comprising a flexible or rigid support that can withstand extreme temperatures, hot and/or cold, and carrying on at least one surface thereof the silicone pressure sensitive adhesives of this invention. Such an article makes full use of the stability at high temperatures and the flexibility at low temperatures that the silicone pressure sensitive adhesives of this invention possess.

EXAMPLES

The following examples are presented to further illustrate the compositions of this invention, but are not to be construed as limiting the invention, which is delineated in the appended claims. All parts and percentages in the examples are on a weight basis and all measurements were obtained at 25° C., unless indicated to the contrary.

The following components were used in the examples; Me and Vi hereinafter represent methyl radical and vinyl radical, respectively.

Polymers

The following dimethylvinylsiloxy-terminated polydimethylsiloxane polymers having an average degree of polymerization (DP) of approximately 9,500 were used in the examples of the instant invention. These polymers had additional vinyl functionality (as methylvinylsiloxy units) randomly distributed along their main chains so as to provide the total molar vinyl contents indicated in the following table:

| Polymer | Total Molar Vinyl Content of Polymer (%) |
|---|---|
| Polymer 1 | 0.1 |
| Polymer 2 | 0.15 |
| Polymer 3 | 0.5 |
| Polymer 4 | 2.0 |
| Polymer 5 | 4.0 |

In addition, the following polydimethylsiloxane polymers were used to prepare comparative PSAs:

Polymer 6 is a polydimethylsiloxane similar to Polymers 1 through 5 wherein the molar vinyl group content is 0.03%.

Polymer 7 is a dimethylvinylsiloxy-terminated polydimethylsiloxane (i.e., no pendant vinyl functionality) having a molar vinyl content of 0.02%.

Polymer 8 is a dimethylvinylsiloxy-terminated polydimethylsiloxane having a total average degree of polymerization (DP) of about 23 and having a total molar vinyl content of 9.6%. This polymer is essentially identical to the vinyl-functional polymer described in Example 15 of EP 0506372.

Resins

Resin 1 = a 72% solution in xylene of a solid MQ resin consisting essentially of trimethylsiloxy units and $SiO_{4/2}$ unit in a molar ratio of about 0.63:1 and having a silicon-bonded hydroxyl content of about 3.5 weight percent (solids basis) and a number average molecular weight ($M_n$) of about 5,000.

Resin 2 = an 81% solution in xylene of a solid MQ resin consisting essentially of trimethylsiloxy units and $SiO_{4/2}$ unit in a molar ratio of about 1.1:1 and having a silicon-bonded hydroxyl content of about 3.3 weight percent (solids basis) and $M_n$ of about 2,700. Resin 3 = a 77% solution in xylene of Resin 2, wherein the resin has been capped with trimethylsiloxy groups so as to provide a residual silicon-bonded hydroxyl content of less than about ½ weight percent (solids basis).

The number average molecular weight of the above described resins was determined by gel-permeation chromatography (GPC) using Varian TSK 4000+2500 columns at 35° C., a chloroform mobile phase at 1 mL/min and an IR detector set at 9.1 microns to detect Si—O—Si. The GPC was calibrated using narrow fractions of similar resins as standards. The $M_n$ values reported herein exclude any neopentamer, $(Me_3SiO)_4Si$, present in the resin component.

The trimethylsiloxy/$SiO_{4/2}$ ratio of the resins was determined by $^{29}Si$ nmr and, in this case, the reported results include any neopentamer component present in the resin.

Crosslinkers

Crosslinker 1 = an organohydrogenpolysiloxane having the general formula $Me_3SiO(Me_2SiO)_{12}(MeHSiO)_{28}SiMe_3$.

Crosslinker 2 = an organohydrogenpolysiloxane having the general formula $HMe_2SiO(Me_2SiO)_{13}SiMe_2H$.

Crosslinker 3 = an organohydrogenpolysiloxane having the general formula $HMe_2SiO(Me_2SiO)_{13}(MeHSiO)SiMe_2H$.

Catalyst

Catalyst 1 = a chloroplatinic acid complex of divinyltetramethyldisiloxane diluted with dimethylvinylsiloxy endblocked polydimethylsiloxane to provide 0.65 weight percent platinum prepared according to Example 1 of U.S. Pat. No. 3,419,593 to Willing, cited supra.

EXAMPLE 1

Silicone PSA solutions were prepared by thoroughly blending Resin 3 with Polymer 4 in various weight ratios. Each such blend was combined with sufficient Crosslinker 1 to provide a molar ratio of SiH groups (of the crosslinker) to SiVi groups (of the polymer) of 0.5. Each PSA solution was mixed with about 0.6% of a diethyl fumarate (DEF) inhibitor and about 0.6% of Catalyst 1, the proportions of the latter two components being based on the total weight of Resin 3 (solution) and Polymer 4.

Each of the adhesive formulations was cast on 1.0 mil thick KAPTON ™ polyimide sheets, the adhesive was cured by heating the coated sheets at 130° C. for 4 minutes to provide cured PSA film having a thickness of about 1.5–2 mils. The coated sheets were cut to prepare PSA tapes which were then evaluated according to the following procedures, the results being presented in Table 1.

Adhesion (A)

Adhesion was measured by cutting the adhesive-coated sheets into one inch (25.4 mm) wide tape, rolling this pressure-sensitive tape onto a stainless steel panel with a five pound (2,270 g) roller and then pulling the tape from the panel at a 180 degree angle at a rate of 12 inches per minute (305 mm/min). The average force required to peel each film from the panel is reported in ounces/inch (oz/in )

Percent Adhesive failure (AF)

When the above described adhesion test resulted in some adhesive transfer from the tape to the steel panel (i.e., some cohesive failure), the AF value represents the percent of the adhesive film remaining on the tape (i.e., AF=100% when no adhesive transferred to the panel; AF=0% when all of the adhesive transfers to the steel panel; intermediate values between these extremes were determined visually).

Tack

Probe tack was measured on one-inch squares of the Kapton ™ —backed adhesive using a POLYKEN[(R)] probe tack tester, available from Testing Machines, Inc., Amityville, N.Y. The tack tester has a 0.5 cm diameter stainless steel probe. The test procedure used a 20 gram weight, a dwell time of 0.5 seconds and a pull speed of 0.5 cm per second. The results are reported as average tack, expressed in grams.

TABLE 1

| R/P ratio | Adhesion (oz/in) | AF (%) | Tack (grams) |
|---|---|---|---|
| 66/34 | 18 | 100 | 784 |
| 67/33 | 27 | 100 | 966 |
| 68/32 | 26 | 100 | 870 |
| 69/31 | 28 | 100 | 676 |

TABLE 1-continued

| R/P ratio | Adhesion (oz/in) | AF (%) | Tack (grams) |
|---|---|---|---|
| 71/29 | 32 | 100 | 548 |
| 73/27 | 34 | 0 | 81 |
| 75/25 | 14–30* | 0 | 0 |
| 77/23 | 20–32* | 0 | 0 |

*slip-stick failure

Based on the above results, it was determined that the optimum resin to polymer weight ratio (R/P) for these PSAs was 67/33. This represents a balance of optimum adhesion as well as tack values wherein the adhesive failure was at least 90%.

Another series of PSAs was prepared as described above wherein the R/P weight ratio was 67/33 and the SiH/SiVi molar ratio was varied. The cured systems were evaluated as described above and the results are presented in Table 2.

TABLE 2

| SiH/SiVi | Adhesion (oz/in) | AF (%) | Tack (grams) |
|---|---|---|---|
| 0.1 | 52 | 70 | 1143 |
| 0.18 | 36 | 95 | 1075 |
| 0.25 | 34.5 | 100 | 1168 |
| 0.5 | 24 | 100 | 869 |
| 0.75 | 18 | 100 | 583 |
| 1.0 | 16 | 100 | 765 |
| 2.0 | 10.5 | 100 | 121 |
| 10.0 | 2* | 100 | 185 |

*slip-stick failure

From Table 2 it can be seen that the optimum PSA composition with respect to adhesion, wherein the adhesive failure is at least 90%, occurs at an SiH/SiVi ratio of about 0.18. Likewise, the optimum PSA composition with respect to tack occurs at an SiH/SiVi ratio of about 0.25.

The above described procedures were used to formulate PSAs wherein other polymers were substituted for Polymer 4, also at a resin/polymer ratio of 67/33. The corresponding optimum SiH/SiVi molar ratios with respect to adhesion (at least 90% adhesive failure) and tack were again obtained and are shown in Table 3.

TABLE 3

| | Optimum Molar SiH/SiVi Ratio | |
|---|---|---|
| Polymer | Based on Adhesion | Based on Tack |
| Polymer 1 | 0.9 | 0.75 |
| Polymer 2 | 0.5 | 0.75 |
| Polymer 3 | 0.25 | 0.25 |
| Polymer 5 | 0.18 | 0.18 |
| Polymer 6 | 10 | 10 |
| Polymer 7 | 30 | 30 |

Figure 2:
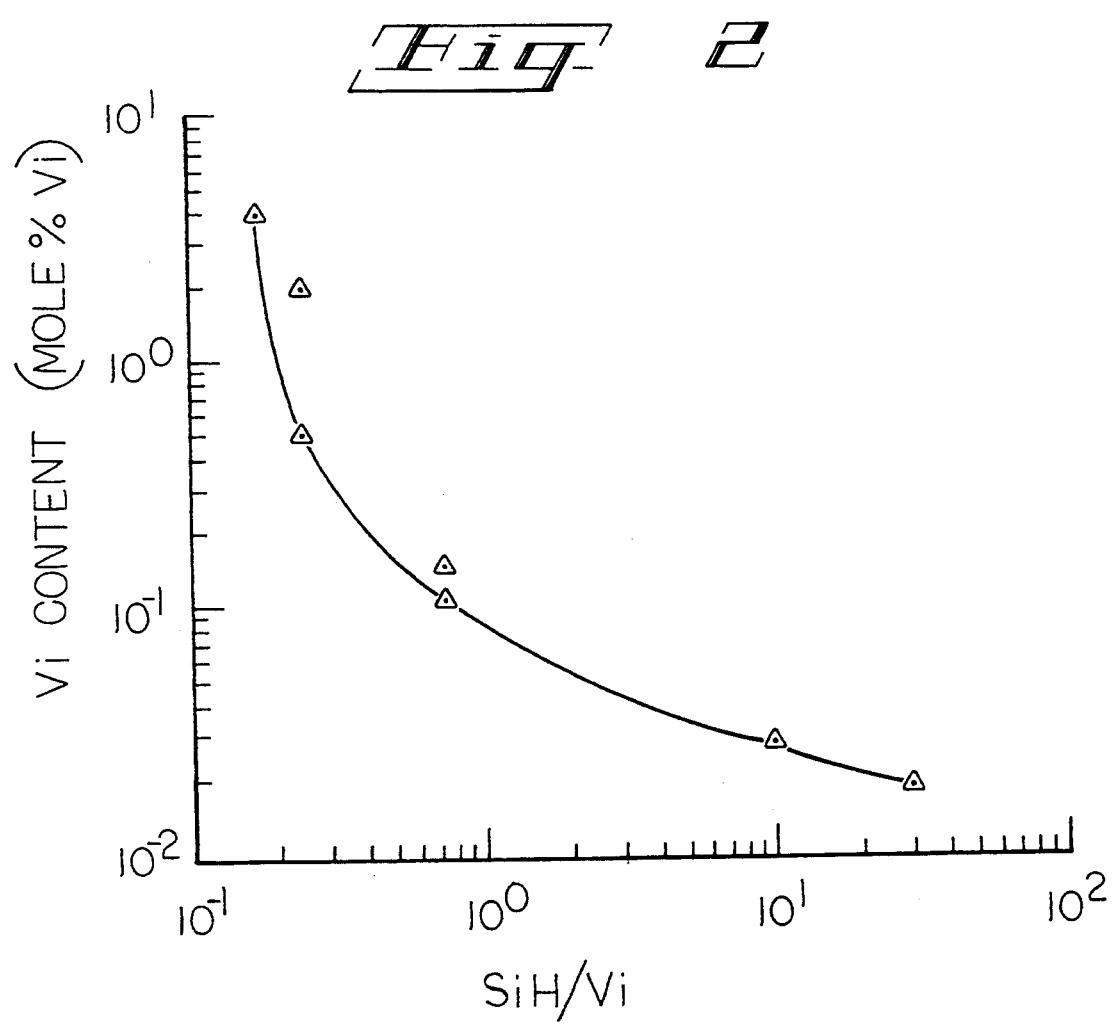
FIG. 2 is a plot of the molar vinyl group content of the PSA polymer versus the molar ratio of silicon-bonded hydrogen groups to silicon-bonded vinyl groups for optimum tack.

The results of Table 3 are also plotted in FIGS. 1 and 2, for adhesion and tack, respectively. In these figures the log of the optimum SiH/SiVi ratio is plotted on the abscissa and the log of the molar vinyl group content of the polymers is plotted on the ordinate, the values for Polymer 4 being included in the graphs. It can be seen that the two plots exhibit similar trends, indicating that approximately the same relationship holds for the adhesion optimum and the tack optimum. It can further be seen that polymers having less than 0.1 mole percent vinyl content (e.g., Polymers 6 and 7) required an SiH/SiVi ratio considerably more than 1.0 to achieve optimum adhesion (at least 90% adhesive failure) and optimum tack values.

EXAMPLES 2–9

Silicone PSAs were prepared as described above using Resin 1 as the resin component and Polymer 2 and Polymer 8 as the polymer components in the proportions shown in Table 4. In each case, the crosslinker was added so as to provide an SiH/SiVi molar ratio of 0.9. These PSAs were cured and tested as described above and the results are also presented in Table 4, wherein R/P represents the resin to polymer weight ratio (based on solids), A represents the adhesive strength (oz/in), AF represents the percent adhesive failure and T represents the tack value (grams).

TABLE 4

| Example | Polymer | R/P | Crosslinker | A | AF | T |
|---|---|---|---|---|---|---|
| 2 | Polymer 2 | 57/43 | Crosslinker 3 | 24 | 100 | 394 |
| 3 | Polymer 2 | 57/43 | Crosslinker 2 | 10 | 60 | 246 |
| 4 | Polymer 8 | 57/43 | Crosslinker 3 | 10 | 100 | 302 |
| 5 | Polymer 8 | 57/43 | Crosslinker 2 | 7 | 20 | 282 |
| 6 | Polymer 2 | 60/40 | Crosslinker 3 | 39 | 100 | 541 |
| 7 | Polymer 2 | 60/40 | Crosslinker 2 | 29 | 0 | 607 |
| 8 | Polymer 8 | 60/40 | Crosslinker 3 | 16 | 100 | 227 |
| 9 | Polymer 8 | 60/40 | Crosslinker 2 | 10 | 20 | 212 |

From Table 4 it is seen that, at an SiH/SiVi molar ratio of 0.9, the PSAs which employ Polymer 8 consistently exhibited inferior adhesive properties relative to those based on Polymer 2. This illustrates the advantage of the instant PSA compositions relative to those suggested in EP 0506372, cited supra, which employ an essentially identical vinyl-functional polymer at the above mentioned SiH/SiVi ratio (Example 15 of EP 0506372). It can also be seen from Table 4 that the use of a crosslinker having at least 3 SiH groups in its molecule (i.e., Crosslinker 3) results in improved adhesive character relative to the crosslinker having only 2 SiH groups.

The procedures of Examples 2–9 were followed wherein Resin 3 was used instead of Resin 1. The resulting PSAs were cured and evaluated as before and the results are shown in Table 5.

TABLE 5

| Example | Polymer | R/P | Crosslinker | A | AF | T |
|---|---|---|---|---|---|---|
| 10 | Polymer 2 | 67/33 | Crosslinker 3 | 50 | 98 | 731 |
| 11 | Polymer 2 | 67/33 | Crosslinker 2 | 64 | 70 | 867 |
| 12 | Polymer 8 | 67/33 | Crosslinker 3 | 14 | 100 | 272 |
| 13 | Polymer 8 | 67/33 | Crosslinker 2 | 2 | 30 | 242 |

As in above Examples 2–9, the advantage of using Polymer 2 over Polymer 8 when the SiH/SiVi molar ratio is below 1.0 (i.e., 0.9) is apparent from the data presented in Table 5. The results again illustrate the benefit of using a crosslinker having at least 3 SiH groups in its molecule since the % adhesive failure dropped below 90% when the crosslinker had only 2 such groups.

That which is claimed is:

1. A silicone pressure sensitive adhesive composition consisting essentially of:
(A) 50 to 80 parts by weight of a non-reactive solvent soluble organopolysiloxane resin consisting essentially of $R_3SiO_{\frac{1}{2}}$ siloxane units and $SiO_{4/2}$ siloxane units wherein each R denotes a monovalent radical selected from the group consisting of hydrocarbon and halogenated hydrocarbon radicals, at least $\frac{1}{3}$ of all R radicals being methyl and the mole ratio of $R_3SiO_{\frac{1}{2}}$ siloxane units to $SiO_{4/2}$ siloxane units in the soluble organopolysiloxane having a value of from 0.6/1 to 1.2/1;

(B) 20 to 50 parts by weight of a polydiorganosiloxane, the organic radicals thereof being selected from the group consisting of hydrocarbon and halogenated hydrocarbon radicals wherein at least ½ of said organic radicals are methyl, said polydiorganosiloxane having at least 3 alkenyl groups in its molecule, with the proviso that the alkenyl group content of said polydiorganosiloxane is 0.1 to 4 mole percent, the total amount of components (A) and (B) being 100 parts by weight;

(C) an organohydrogenpolysiloxane crosslinking agent having, on average, at least 3 SiH groups per molecule, the amount of said organohydrogenpolysiloxane being sufficient to provide a molar ratio of said SiH groups of component (C) to said alkenyl groups of component (B) in the range of 0.1 to <0.9; and (D) a curing amount of a hydrosilation catalyst.

2. The composition according to claim 1, wherein R of said resin (A) is methyl and said polydiorganosiloxane (B) is an alkenyl-functional polydimethylsiloxane.

3. The composition according to claim 2, wherein the degree of polymerization of said polydiorganosiloxane (B) is greater than 500.

4. The composition according to claim 3, wherein the alkenyl groups on said polydiorganosiloxane (B) are vinyl radical.

5. The composition according to claim 4, wherein the weight ratio of said resin (A) to said polydiorganosiloxane (B) is 65/35 to 75/25.

6. The composition according to claim 5, wherein the number average molecular weight of said resin (A) is 2,300 to 3,300.

7. A silicone pressure sensitive adhesive composition consisting essentially of:

(A) 50 to 80 parts by weight of a non-reactive solvent soluble organopolysiloxane resin consisting essentially of $R_3SiO_{\frac{1}{2}}$ siloxane units and $SiO_{4/2}$ siloxane units wherein each R denotes a monovalent radical selected from the group consisting of hydrocarbon and halogenated hydrocarbon radicals, at least ½ of all R radicals being methyl and the mole ratio of $R_3SiO_{\frac{1}{2}}$ siloxane units to $SiO_{4/2}$ siloxane units in the soluble organopolysiloxane having a value of from 0.6/1 to 1.2/1;

(B) 20 to 50 parts by weight of a polydiorganosiloxane having the general formula $R^1R^2{}_2SiO(R^2{}_2SiO)_nSiR^2{}_2R^1$ wherein each $R^2$ is a monovalent organic radical independently selected from the group consisting of hydrocarbon and halogenated hydrocarbon radicals and each $R^1$ denotes a radical selected from the group consisting of $R^2$ radicals and an OH radical, wherein at least ½ of the organic radicals are methyl and said polydiorganosiloxane has at least 3 alkenyl groups in its molecule, with the proviso that the alkenyl group content of said polydiorganosiloxane is 0.1 to 4 mole percent and the total amount of components (A) and (B) is 100 parts by weight;

(C) an organohydrogenpolysiloxane crosslinking agent having at least 3 SiH groups in its molecule selected from the group consisting of polymers having the formula

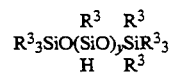

and copolymers having the formula

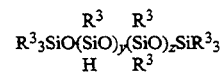

wherein $R^3$ is independently selected from the group consisting of alkyl radicals having 1 to 4 carbon atoms, a trifluoropropyl radical and a chloropropyl group, y has an average value of 3 to 40 and z has an average value of 1 to 100, the amount of said organohydrogenpolysiloxane being sufficient to provide a molar ratio of said SiH groups of component (C) to said alkenyl groups of component (B) of 0.1 to <0.9; and (D) a curing amount of a hydrosilation catalyst.

8. The composition according to claim 7, wherein R of said resin (A) is methyl

9. The composition according to claim 8, wherein at least 85 mole percent of the $R^2$ groups of said polydiorganosiloxane (B) are methyl.

10. The composition according to claim 9, wherein $R^3$ of said organohydrogenpolysiloxane (C) is methyl and the alkenyl groups of said polydiorganosiloxane (B) are vinyl.

11. The composition according to claim 10, wherein the degree of polymerization of said polydiorganosiloxane (B) is greater than 500.

12. The composition according to claim 11, wherein the ratio of said resin (A) to said polydiorganosiloxane (B) is 65/35 to 75/25.

13. The composition according to claim 12, wherein the number average molecular weight of said resin (A) is 2,300 to 3,300.

14. The composition according to claim 7, wherein the ratio of said resin (A) to said polydiorganosiloxane (B) is 65/35 to 75/25.

15. A substrate having at least a portion of its surface coated with the pressure-sensitive adhesive composition of claim 1.

16. A substrate having at least a portion of its surface coated with the pressure-sensitive adhesive composition of claim 2.

17. A substrate having at least a portion of its surface coated with the pressure-sensitive adhesive composition of claim 5.

18. A substrate having at least a portion of its surface coated with the pressure-sensitive adhesive composition of claim 7.

19. A substrate having at least a portion of its surface coated with the pressure-sensitive adhesive composition of claim 12.

20. A substrate having at least a portion of its surface coated with the pressure-sensitive adhesive composition of claim 14.

21. The composition according to claim 1, wherein said crosslinking agent (C) is a hydrosilation reaction product of (I) an organohydrogenpolysiloxane selected from the group consisting of a cyclic siloxane having the formula

a linear siloxane having the formula

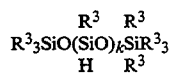

and a linear siloxane having the formula

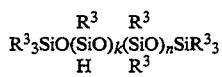

wherein $R^3$ is independently selected from the group consisting of alkyl radicals having 1 to 4 carbon atoms, a phenyl radical, a trifluoropropyl radical and a chloropropyl group, j has an average value of 4 to 8, k has an average value of 5 to 20 and n has an average value of 1 to 20, with the proviso that $k+n \leq 25$; and (II) an unsaturated organic compound selected from the group consisting of an alpha-alkene having 6 to 28 carbon atoms and an aromatic compound having the formula Ph-$R^4$, wherein Ph represents a phenyl radical and $R^4$ is a terminally unsaturated monovalent hydrocarbon group having 2 to 6 carbon atoms.

22. The composition according to claim 7, wherein said crosslinking agent (C) is a hydrosilation reaction product of (I) an organohydrogenpolysiloxane selected from the group consisting of a cyclic siloxane having the formula

a linear siloxane having the formula

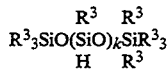

and a linear siloxane having the formula

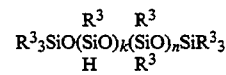

wherein $R^3$ is independently selected from the group consisting of alkyl radicals having 1 to 4 carbon atoms, a phenyl radical, a trifluoropropyl radical and a chloropropyl group, j has an average value of 4 to 8, k has an average value of 5 to 20 and n has an average value of 1 to 20, with the proviso that $k+n \leq 25$; and (II) an unsaturated organic compound selected from the group consisting of an alpha-alkene having 6 to 28 carbon atoms and an aromatic compound having the formula Ph-$R^4$, wherein Ph represents a phenyl radical and $R^4$ is a terminally unsaturated monovalent hydrocarbon group having 2 to 6 carbon atoms.

* * * * *